March 4, 1924.                                              1,485,747
                            D. M. WARNER
           RELEASABLE COUPLING FOR AVIATOR OR PARACHUTE HARNESS
                          Filed March 2, 1922
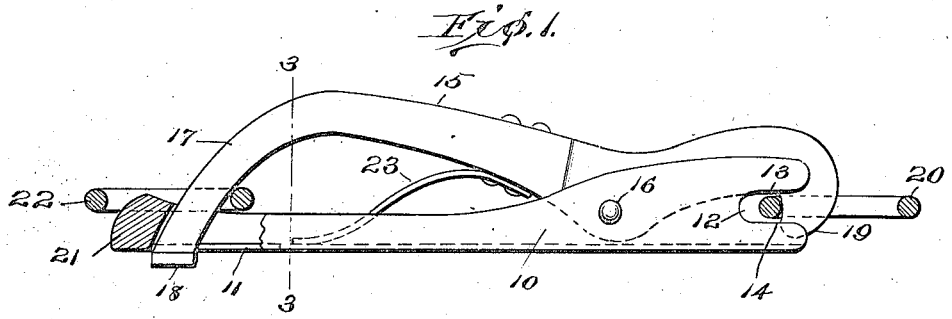
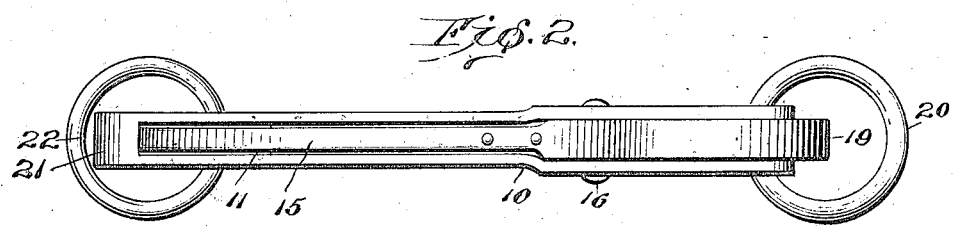
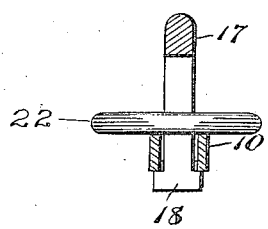
Inventor
D. M. Warner
By Robt A. Young
Attorney Patented Mar. 4, 1924.

1,485,747

UNITED STATES PATENT OFFICE.

DAVID M. WARNER, OF DAYTON, OHIO.

RELEASABLE COUPLING FOR AVIATOR OR PARACHUTE HARNESS.

Application filed March 2, 1922. Serial No. 540,553.

*To all whom it may concern:*

Be it known that I, DAVID M. WARNER, a citizen of the United States, residing at Dayton, in the county of Montgomery and State of Ohio, have invented certain new and useful Improvements in Releasable Couplings for Aviator or Parachute Harness, of which the following is a specification.

This invention relates to a releasable coupling device particularly useful in attaching the harness worn by an aviator to a parachute and permitting a quick release when the circumstances require, but capable also of general application.

The primary object of the invention is to provide a coupling device which will hold firmly and securely unless positively released, the releasing action taking place very quickly.

The invention is hereinafter more fully described in connection with the accompanying drawings. Objects of a more specific nature will become apparent in the description and the essential characteristics are summarized in the claims.

In the drawings:

Figure 1 is a side elevation of the coupling device, the supporting and load rings being shown in section;

Figure 2 is a plan view of the device; and

Figure 3 is a sectional view on the line 3—3 of Figure 1.

The numeral 10 designates a channel shaped member having an axial slot 11 formed through a part of the length thereof. At the forward end of the member 10 the side flanges are wider than at the rear and the extreme forward ends of the flanges are provided with transversely aligning recesses 12 which are defined by cam-shaped surfaces 13, 14.

A lever member 15, preferably a casting or forging, is positioned between the side flanges of the channel 10 and is intermediately pivoted thereto by means of a pin 16 which passes through registering apertures in said members. The member 15 is provided with a rear extension 17 of less thickness than the body portion thereof. The rear extension projects downwardly through the slot 11 and the lower end thereof is enlarged at 18 to a greater width than said slot in order to prevent this head 18 from passing through the slot. The head 18 thus limits the closing movement of the pivoted members. The forward end of the lever member 15 is hook-shaped as indicated at 19, and this hook is adapted to cooperate with the recesses 12 in retaining a ring 20 in operative position. The ring 20 is attached to the harness of the aviator.

The rear end of the channel 10 is reinforced by a cross-piece 21 welded to the flanges and web of the channel so as to close effectively the slot 11. A ring 22 is attached to a sustaining surface or support such as a parachute by means of the ropes thereof, and is assembled with the lever members 10 and 15 so that its operative position will be at the intersection of rear extension 17 and the flanges of channel 10, as shown in Figure 1. A leaf spring 23 is riveted at one end to the lever member 15 and bears at the other end upon the web of channel member 10, thus normally tending to maintain the hook 19 in closed relation to the recesses 12.

In case a load is suspended on the coupling device, as when an aviator is dropping by means of a parachute, it is very difficult to press the lever members together, as the load tends to keep them in closed position. However, when the aviator desires to obtain release from the parachute, he may grasp the ropes of the latter and momentarily lift himself in order to relieve the coupling device of the load. The portions of the lever members in the rear of pin 16 may then be readily pressed together and the cam-shaped surfaces 13, 14 will aid in expelling the ring 20 from engagement with the hook 19. If the aviator desires to wait until the ground is reached he may do so, as when contact with the ground is made, tension on the fastening device is lessened and the lever members may be readily pressed together so as to release the load ring 20. This quick release prevents the aviator from being dragged along the ground by the parachute on the completion of the descent.

I claim:

1. A releasable coupling device comprising, in combination, pivoted members, means engaged by said members for attachment to a support, means releasably engaged by said members for attachment to a load, said first named means being engaged by said members in such a manner that the load will tend to prevent release of said second named means, and resilient means tending to prevent release of said second named means upon release of the tension due to the load, 2. A releasable coupling device comprising in combination, pivoted members, means engaged by said members for attachment to a support, means releasably engaged by said members for attachment to a load, said first named means being engaged by said members in such a manner that the load will tend to prevent release of said second named means, and manually compressible resilient means tending to prevent release of said second named means upon release of the tension due to the load.

3. A releasable coupling device, a channel member having recesses in the flanges thereof, and a slot formed in the web, a lever member pivoted thereto having a hook adapted to open and close said recesses, a curved extension of said lever member passing through said slot, means on the end of said lever member for limiting the closing member of said hook, means adapted to be attached to a load and to be held in said recesses by said hook, and means engaged between said curved lever extension and said web and adapted to be attached to a support.

4. A releasable coupling device, a channel member having recesses in the flanges thereof, and a slot formed in the web, a lever member pivoted thereto having a hook adapted to open and close said recesses, a curved extension of said lever member passing through said slot, means on the end of said lever member for limiting the closing motion of said hook, means adapted to be attached to a load and to be held in said recesses by said hook, means engaged between said curved lever extension and said web and adapted to be attached to a support, and manually compressible resilient means adapted to hold said load attaching means upon release of the tension of the load on the holding members.

In testimony whereof I affix my signature.

DAVID M. WARNER.